(12) United States Patent
Guess et al.

(10) Patent No.: US 6,613,236 B1
(45) Date of Patent: Sep. 2, 2003

(54) WATER FILTER MONITORING AND INDICATING SYSTEM

(75) Inventors: Ronald W. Guess, Evansville, IN (US); Dale A. Beard, Dayton, OH (US); Patrick J. Glotzbach, St. Joseph, MI (US); Keith A. Snyder, Evansville, OH (US)

(73) Assignee: Whirlpool Corporation, Benton Harbor, MI (US)

( * ) Notice: Subject to any disclaimer, the term of this patent is extended or adjusted under 35 U.S.C. 154(b) by 0 days.

(21) Appl. No.: 10/115,849

(22) Filed: Apr. 3, 2002

Related U.S. Application Data (62) Division of application No. 09/605,776, filed on Jun. 28, 2000, now Pat. No. 6,375,834.
(60) Provisional application No. 60/141,693, filed on Jun. 30, 1999.

(51) Int. Cl.[7] .............................................. B01D 35/143
(52) U.S. Cl. .............................. 210/739; 62/338; 62/125
(58) Field of Search ........................... 62/317, 318, 319, 62/125, 127, 338, 339; 222/36, 189.06, 146.6; 210/767, 739, 85, 87, 88, 89, 138; 340/607; 73/861

(56) References Cited

U.S. PATENT DOCUMENTS

| | | | |
|---|---|---|---|
| 3,982,406 A | | 9/1976 | Hanson et al. |
| 5,135,645 A | | 8/1992 | Sklenak et al. |
| 5,435,909 A | * | 7/1995 | Burrows |
| 5,707,518 A | | 1/1998 | Coates et al. |
| 5,715,699 A | | 2/1998 | Coates et al. |
| 5,813,245 A | | 9/1998 | Coates et al. |
| 5,865,991 A | * | 2/1999 | Hsu |
| 5,907,958 A | | 6/1999 | Coates et al. |
| 5,935,426 A | * | 8/1999 | Giordano et al. |
| 6,085,586 A | * | 7/2000 | Arvidson et al. |
| 6,214,239 B1 | * | 4/2001 | Renau |
| 6,355,177 B2 | * | 3/2002 | Senner et al. ............... 210/739 |

* cited by examiner

*Primary Examiner*—Joseph Drodge
*Assistant Examiner*—Terry K. Cecil
(74) *Attorney, Agent, or Firm*—Robert O. Rice; Stephen D. Krefman; John F. Colligan (57) ABSTRACT

A low cost method and apparatus for indicating when to replace a water filter in a water and ice delivery system for a refrigerator. The invention uses a low cost microprocessor and senses the operational condition of an ice maker water valve, a water dispenser valve to monitor and track water usage. The microprocessor has a built-in memory to retain water usage and other data during a power outage. The invention also senses the status of a door switch to permit user input of a reset message indicating that the filter has been changed as well as an input indicating a different type of filter has been installed. The microprocessor controls a tri-color light emitting diode to display the status of the filter as "good", "order" or "change" which is determined based on the selection of the type of filter system, the amount of time since the last filter change, and the amount of water usage since the last filter change.

18 Claims, 9 Drawing Sheets

Table I

| Reference | Type | Description |
|---|---|---|
| 74 | Resistor | Film 47 2W 5% Axial, Dale CW 2B |
| 76 | Capacitor | Neft. 0.68U 250V 20% Radial |
| 78 | Capacitor | Cer. 0.1U 50V 20% Radial |
| 80 | Capacitor | ELYT 470U 16V 20% |
| 86 | Diode | Zener IN5231B 5V D035 |
| 90 | Connector | HDR-RT Lock 4P/2R 9A 0.165 |
| 110 | Diode | LED-G/R 20mA 2V TI3/4-RT |
| 126 | Resistor | Film 6.8 1/4W 5% Axial |
| 128 | Diode | XSTR PNP 2N3906 TO-92 |
| 140 | IC uP | CMOS PIC12CE518-04/P PDIP8 |
| 82, 84 | Diode | Rctf. IN4007 1000V DO41 |
| 122, 124 | Resistor | Film 39K 1/4W 5% Axial |
| 136, 138 | Resistor | Film 300 1/4W 5% Axial |
| 114a, 116a, 118a | Resistor | Film 1M 1/4W 5% Axial |
| 114b, 116b, 118b | Resistor | Film 220K 1/4W 5% Axial |

WATER FILTER MONITORING AND INDICATING SYSTEM

CROSS REFERENCE TO RELATED APPLICATIONS

This application is a divisional of U.S. patent application Ser. No. 09/605,776 filed Jun. 28, 2000, now U.S. Pat. No. 6,375,834, issued Apr. 23, 2002, which is a non-provisional of provisional application number 60/141,693 filed Jun. 30, 1999, now expired.

BACKGROUND OF THE INVENTION

1. Field of the Invention

The invention relates to a water filtration system for a refrigerator and more particularly to an indicator for notifying a user when to change the filter.

2. Description of the Related Art

Many refrigerators, and especially those using a side-by-side configuration wherein the fresh food compartment is to the side of the frozen food compartment, include integrated ice and water delivery systems. Typically, such systems deliver water and ice through the door of the frozen food compartment to a ice and water station recessed in the door.

Examples of such systems can be seen in U.S. Pat. No. 5,907,958 issued Jun. 1, 1999 to Coates, et al. and entitled "Refrigerator water filter"; U.S. Pat. No. 5,813,245 issued Sep. 29, 1998 to Coates, et al. and entitled "Pressure relief circuit for refrigerator contained water filter"; U.S. Pat. No. 5,715,699 issued Feb. 10, 1998 to Coates, et al. and entitled "Refrigerator water filter"; U.S. Pat. No. 5,707,518 issued Jan. 13, 1998 to Coates, et al. and entitled "Refrigerator water filter"; U.S. Pat. No. 5,135,645 issued Aug. 4, 1992 to Sklenak, et al. and entitled "Refrigerator water filter"; and U.S. Pat. No. 3,982,406 issued Sep. 28, 1976 to Hanson, et al. and entitled "Refrigerator water storage and dispensing system with water filter".

Increasingly such systems incorporate a filtration system with a replaceable filter element or cartridge so as to improve the quality of the ice and water delivered to the user of the refrigerator. Since the filters must be periodically replaced to maintain the quality of the water, various methods and apparatus could be used to notify the user of the need to change the filter. However, such many potential approaches would be costly, complex and inflexible as to substitution of different types of filters having different useful lives. Furthermore, in an effort to such reduce cost, many such approaches fail to give the user advance warning that the filter will soon need to replaced.

What is needed, therefore, is a filter monitoring and indicating system that is flexible enough to permit its use with different types of filters yet doesn't add the cost of requiring an additional switch or sensor for detecting the type of filter being used.

What is further needed is an inexpensive filter monitoring and indicating system that not only informs the user that the filter needs to be replaced, but provides earlier warning that the filter will need to be replaced soon and therefore a new filter needs to purchased.

SUMMARY OF THE INVENTION

The present invention is directed to a low cost method and apparatus for monitoring the operation of a water and ice delivery system for a refrigerator and indicating when to replace a water filter used in the water and ice delivery system.

The water filter monitoring and indicating method and apparatus of the present invention relies on components existing in many conventional water and ice delivery systems and refrigerators to reduce complexity and number of components and senses the operational condition of the fresh food compartment door and the valves regulating the water flow into the ice maker and the water dispenser of the refrigerator. The method and apparatus monitors and tracks the duration of valve openings to estimate water consumption since the filter has been changed as well as tracking the amount of time that has passed since the last time the filter has been changed. The method and apparatus further tracks user inputs to the fresh food compartment door switch to determine when a filter has been replaced. The water filter monitoring and indicating method and apparatus determines when the filter needs to be changed by comparing the water usage and filter age data with a first set of pre-selected standards for the type of filter being used and further determines when a new filter should be ordered by comparing the water usage and filter age data with a second set of pre-selected standards for the type of filter being used, the second set of pre-selected standards being more stringent than the first set. The method and apparatus then uses a tri-color light emitting diode to display one color when the filter should be replaced, a second color when a filter should be ordered and a third when the filter is good.

In the preferred embodiment of the present invention, the water filter monitoring and indicating system uses a low cost microprocessor to compare the water usage and filter age data with the first and second sets of pre-selected standards, to generate and track a conclusion of a status of "good", "order" or "change" (or alternatively, "used") for the filter based on such comparison, and to illuminate the light emitting diode in pre-selected color corresponding to that conclusion of status.

The microprocessor of the water filter monitoring and indicating system of the present invention preferably includes a built-in memory to retain water usage and other data during a power outage.

The light emitting diode of the water filter monitoring and indicating system preferably is illuminated green for a filter status of "good", yellow for a filter status of "order" and red for a filter status of "change" or "used".

The water filter monitoring and indicating system preferably further tracks user inputs to the fresh food compartment door switch to determine what type of filter is being used and utilizes a different first and second set of pre-selected standards for each type of filter selectable by the user.

The light emitting diode of the water filter monitoring and indicating system is preferably located within the fresh food compartment of the refrigerator near the fresh food compartment door switch of the refrigerator.

The present invention thereby provides a filter monitoring and indicating system that is flexible enough to permit its use with different types of filters yet doesn't add the cost of requiring an additional switch or sensor for detecting the type of filter being used by utilizing manual user input to the existing fresh food compartment door switch at a rate which would be unlikely to occur in normal door openings and closings.

What is further needed is an inexpensive filter monitoring and indicating system that informs the user that filter needs to be replaced, by illuminating red and further provides early warning that the filter will need to be replaced soon and therefore a new filter needs to purchased by illuminating yellow.

These and other advantages of the present invention will become apparent to those skilled in the art when the following detailed description of the preferred embodiment is read in conjunction with the accompanying drawings.

DESCRIPTION OF THE PREFERRED EMBODIMENT

The Refrigerator

Figure 1:
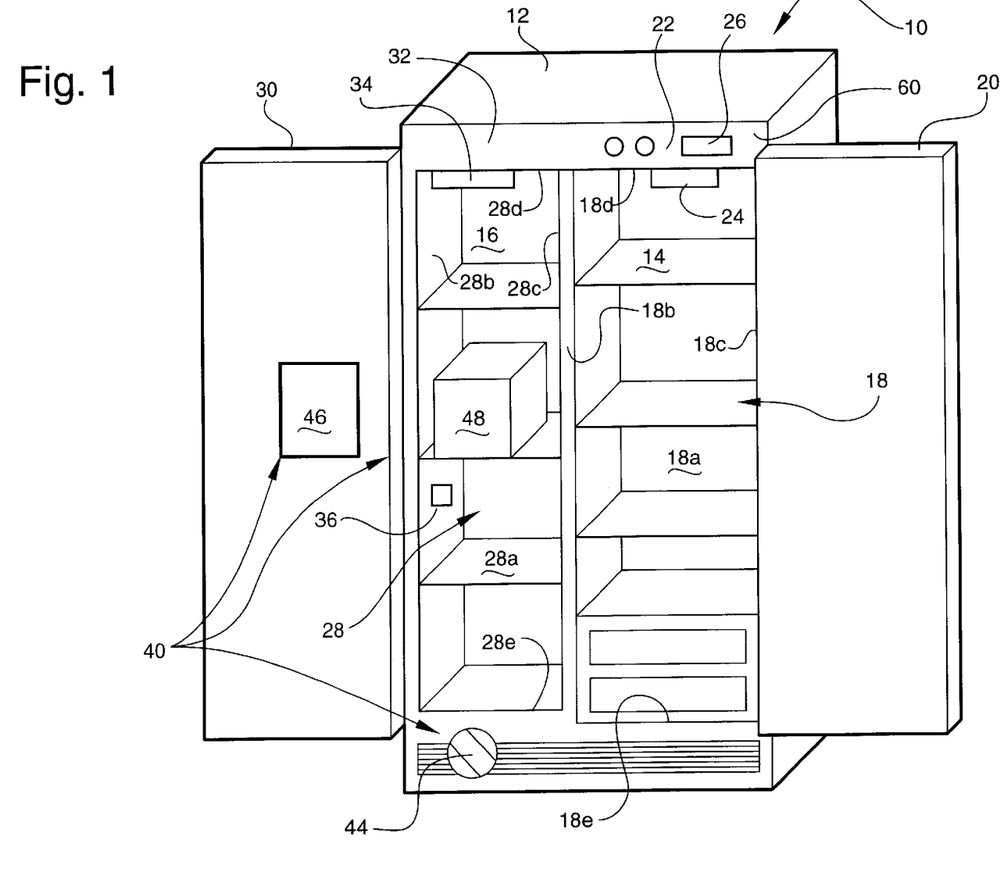
FIG. 1 is a front perspective view of a refrigerator apparatus having a water filtration and filter control and indicator system embodying the present invention.

In the illustrative embodiment of the invention as shown in FIG. 1 a refrigerator 10, comprising a side-by-side fresh food/freezer configuration, is provided having a cabinet 12 forming fresh food compartment 14 and freezer compartment 16.

The fresh food compartment 14 is provided with an access opening 18 and a fresh food door 20 hingedly mounted to the cabinet 12 for selectively closing the access opening 18. The access opening 18 has a back wall 18a, side walls 18b and 18c, top wall 18d, and a bottom wall 18e. The refrigerator 10 also has a partial front wall 22 disposed around the perimeter of the access opening 18 parallel to and selectively engageable with the fresh food door 20 for sealing the access opening 18.

The fresh food compartment 14 is further provided with a light 24 which is connected in series with a light switch 26. The light switch 26 is a reciprocable switch actuated to selectively connect the light 24 with a source of electrical power, not shown, when the door 20 is in an open position and to disconnect the light 24 from the source of electrical power when the fresh food door 20 is in the closed position. In the preferred embodiment, the light switch is located in portion of the partial front wall 22 above the top wall 18d of the access opening.

Similarly, the freezer compartment 16 is provided with an access opening 28 and a freezer door 30 hingedly mounted to the cabinet 12 for selectively closing the access opening 28. The access opening 28 has a back wall 28a, side walls 28b and 28c, top wall 28d, and a bottom wall 28e. The refrigerator 10 also has a partial front wall 32 disposed around the perimeter of the access opening 28 parallel to and selectively engageable with the freezer door 30 for sealing the access opening 28. The freezer compartment 14 is further provided with a rocker-type light 34 which is connected in series with a light switch 36 functionally similar to the light 24 and light switch 36 in the fresh food compartment 14.

Figure 2:
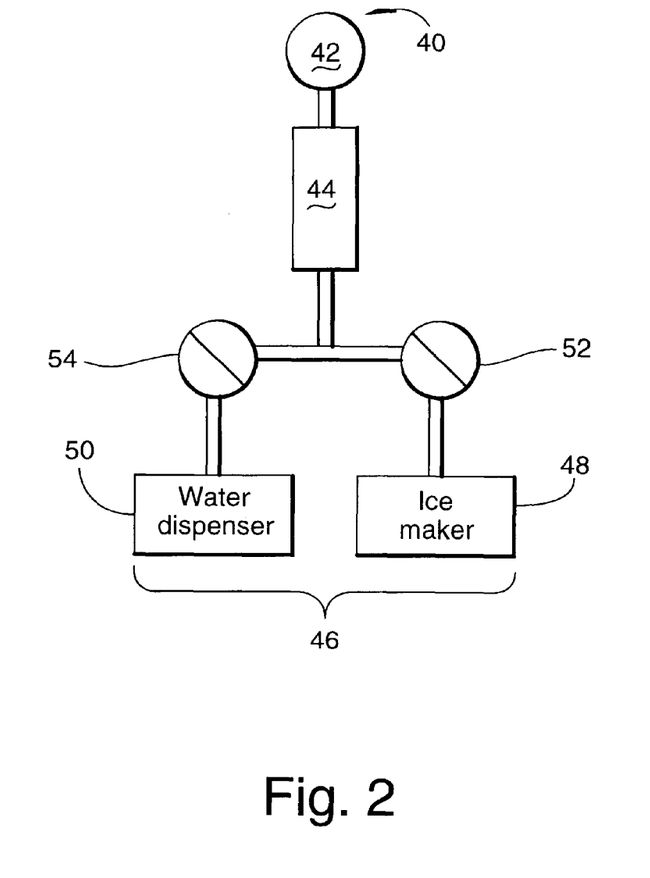
FIG. 2 is a schematic diagram of the ice and water assembly of the refrigerator apparatus of FIG. 1.

As is further well known in the art, the refrigerator 10 is provided with a water and ice supply system 40, shown schematically in FIG. 2 for delivering water from an external source 42 through a filter 44 to an ice and water delivery system 46.

The filter 44 may be mounted to the refrigerator below the bottom wall 28e of the access opening 28 and accessed for servicing by selective removal through an opening through the lowermost portion of the partial front wall 32, as shown in FIG. 1.

The ice and water delivery system 46 includes an ice making assembly 48 mounted within the freezer compartment 16 and an ice and water dispensing system 50 mounted in the freezer door 30.

The ice making assembly 48 is mounted to the inside surface of the back wall 28a of the freezer compartment 16. The ice and water dispensing system 50 is provided below the ice making assembly 48 for receiving ice pieces therefrom as well as for receiving cool water from a water supply system 40. As shown in FIG. 2, the water and ice supply system 40 includes electrically operable water valves 52 and 54 for supplying water, respectively, to the ice making assembly 48 and the ice and water dispensing system 50.

The ice and water dispensing system 50 includes an ice storage receptacle or bin 56. When operated, the ice and water dispensing system 50 transfers ice pieces from the ice storage receptacle or bin 56 through the freezer door 30 whereby ice pieces may be dispensed through a conventional, forwardly exposed ice dispenser station or external ice service area 58.

Figure 3:
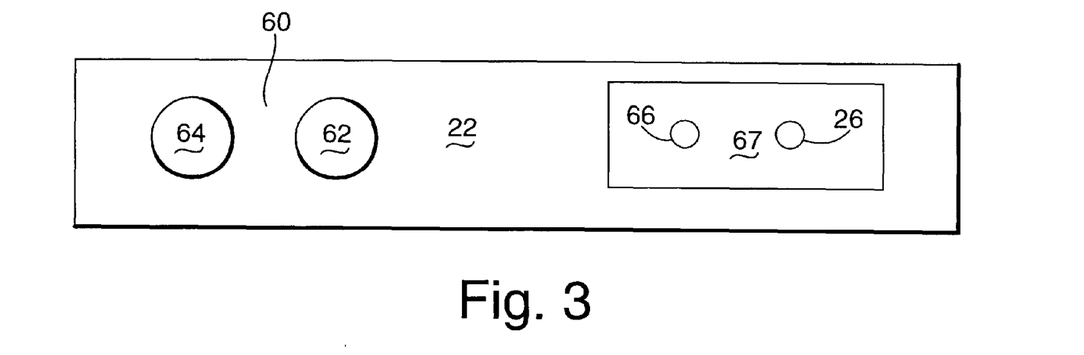
FIG. 3 is a fragmentary enlarged front view of the refrigerator control console of the refrigerator of FIG. 1.

In the preferred embodiment of the present invention, a refrigerator control console 60 is defined on an upper portion of the partial front wall 22 of the fresh food compartment 16 in the vicinity of the light switch 26. The refrigerator control console 60, which is shown integral with the front wall 22, includes a fresh food compartment temperature control switch 62, a freezer compartment temperature control switch 64, the light switch 26. In the vicinity of the light switch 26, the refrigerator control console also includes a filtration system status indicator 66, described later in detail. The refrigerator control console 60 further incorporates a consumer label 67 surrounding the switch 26 and the indicator 66 on which is printed the following written matter describing the operation of the filter 44 and the meaning of the status indicator 66:

| "EZ-CHANGE SIGNAL | FILTER INDICATOR RESET |
|---|---|
| Green = Good Filter | Push the light switch |
| Yellow = Order Filter | 5 times in 10 seconds to reset |
| Red = Change Filter | filter indicator to green." |

Components of the Water Filter Status Monitoring and Indicating System

Figure 4:
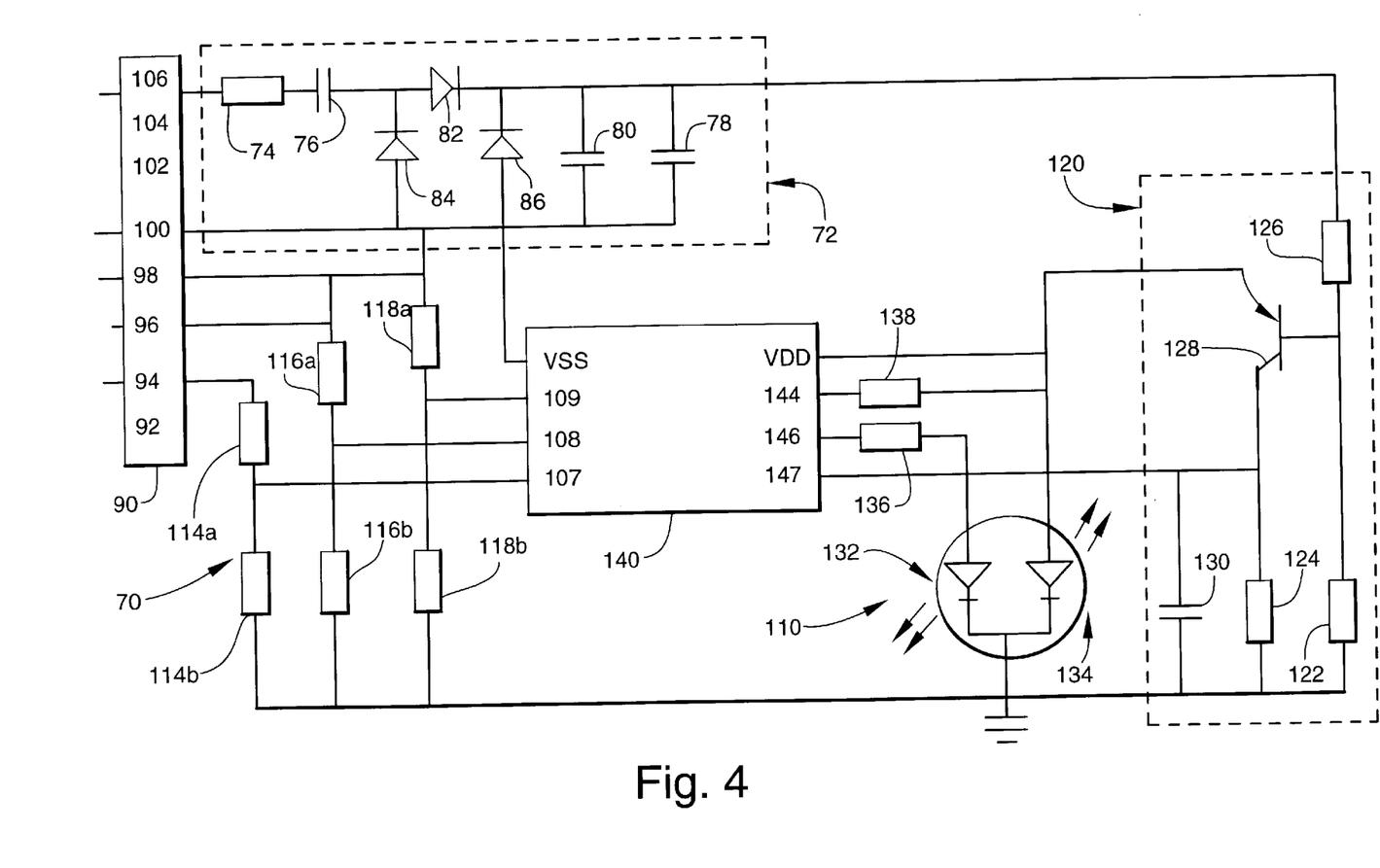
FIG. 4 is a schematic electrical diagram illustrating the electrical circuitry of the filter control and indicator system of FIG. 1.

Referring now to the FIG. 4, the Refrigerator 10 includes a water filter status monitoring and indicating system 70. The water filter status monitoring and indicating system 70 includes a power supply 72 comprising resistor 74, capacitors 76, 78 and 80 and diodes 82, 84, and 86 in a conventional capacitive drop design with capacitor 76 as the charge pump device, diode 82 as the rectifier. Diode 84 provides noise suppression and functions as a clamping diode. Diode 86 (5.1V, 500 mW) is a zener diode used as a simple voltage regulator. Capacitor 80 functions as the reservoir capacitor and capacitor 78 provides high frequency bypass. Resistor 74 is critical to line surge performance of the overall circuit since it absorbs most of the pulse energy.

The water filter status monitoring and indicating system 70 has an input connector 90 with three identical discrete digital inputs 94, 96 and 98, respectively, for monitoring the light switch 26 and the water valve electrical input of water valve 54 associated with the water dispenser of the ice and water dispensing system 50, and the water valve electrical input of water valve 52 associated with the ice making apparatus 48. These inputs are designed for 120V (RMS) signals directly from the monitored loads. Each of these inputs has an identical input resistive divider network respectively comprised of pairs of resistors 114a, 114b, 116a, 116b, 118a and 118b. Each resistor pair, 107, 108 and 109, can also be viewed as a series device to limit current into the microprocessor input pin, respectively, to the microprocessor device 140 described later, and a shunt device to provide input pull-down to a known state when the associated load is not activated.

The input connector 90 further has inputs 100 and 106 respectively connected to the neutral and the hot lines of the AC power supplied to the refrigerator 10. Inputs 92, 102 and 104 of the input connector 90 are not used.

The water filter status monitoring and indicating system 70 also has a power-on reset circuit 120 comprised of resistors 122, 124 and 126, transistor 128, and capacitor 130.

Resistors 122 and 126 set the reset threshold voltage and provide base drive for the transistor 128, and, in turn provides a pull-up voltage to master clear input 147. Resistor 124 is a passive pull-down to the master clear input 147 of the microprocessor device 140 when VDD is low which establishes a valid logic low when VDD is below the threshold. Capacitor 130 provides filtering for high frequency noise and transients.

The water filter status monitoring and indicating system 70 further includes the filtration system status indicator 66, which in the preferred embodiment consists of a bi-color device 110 containing a red LED die 132 and a green LED die 134.

The microprocessor device 140 provides all logic functionality and memory. In addition to red and green, the color amber can be achieved by alternating resistors 136 and 138 by providing alternating signals from microprocessor output pins 144 and 146.

Microprocessor device 140 is preferably a Microchip PIC12CE518 device, which contains 512 words of program ROM (implemented as OTP EPROM) and includes a 16 by 16 EEPROM.

Figure 4B:
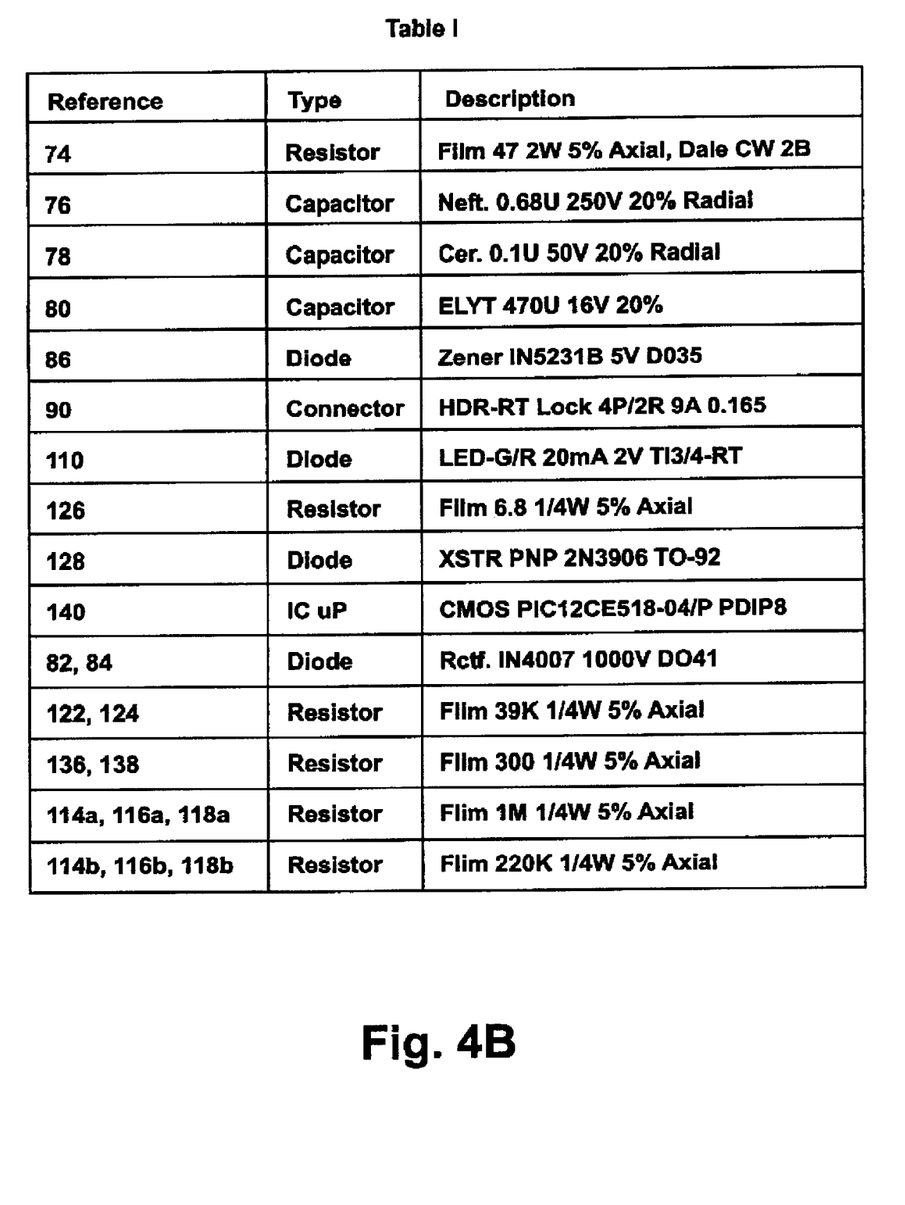
FIG. 4b is a table indicating specifications of preferred components of the filter control and indicator system of FIG. 4.

The specifications of the preferred components of the water filter status monitoring and indicating system are shown in Table 1 of FIG. 4b.

Programming Logic of the Water Filter Status Monitoring and Indicating System

FIG. 5 through FIG. 8 illustrate the programming and logic of the water filter status monitoring and indicating system 70 which is programmed into the microprocessor device 140. The Logic is intended to provide programming for alternative models, such as an A model refrigerator a B model refrigerator or a C model refrigerator, each having different functionality. The various models may have different replacement criteria for the filters depending on the gallon rating and the useful life of the filter.

Figure 5:
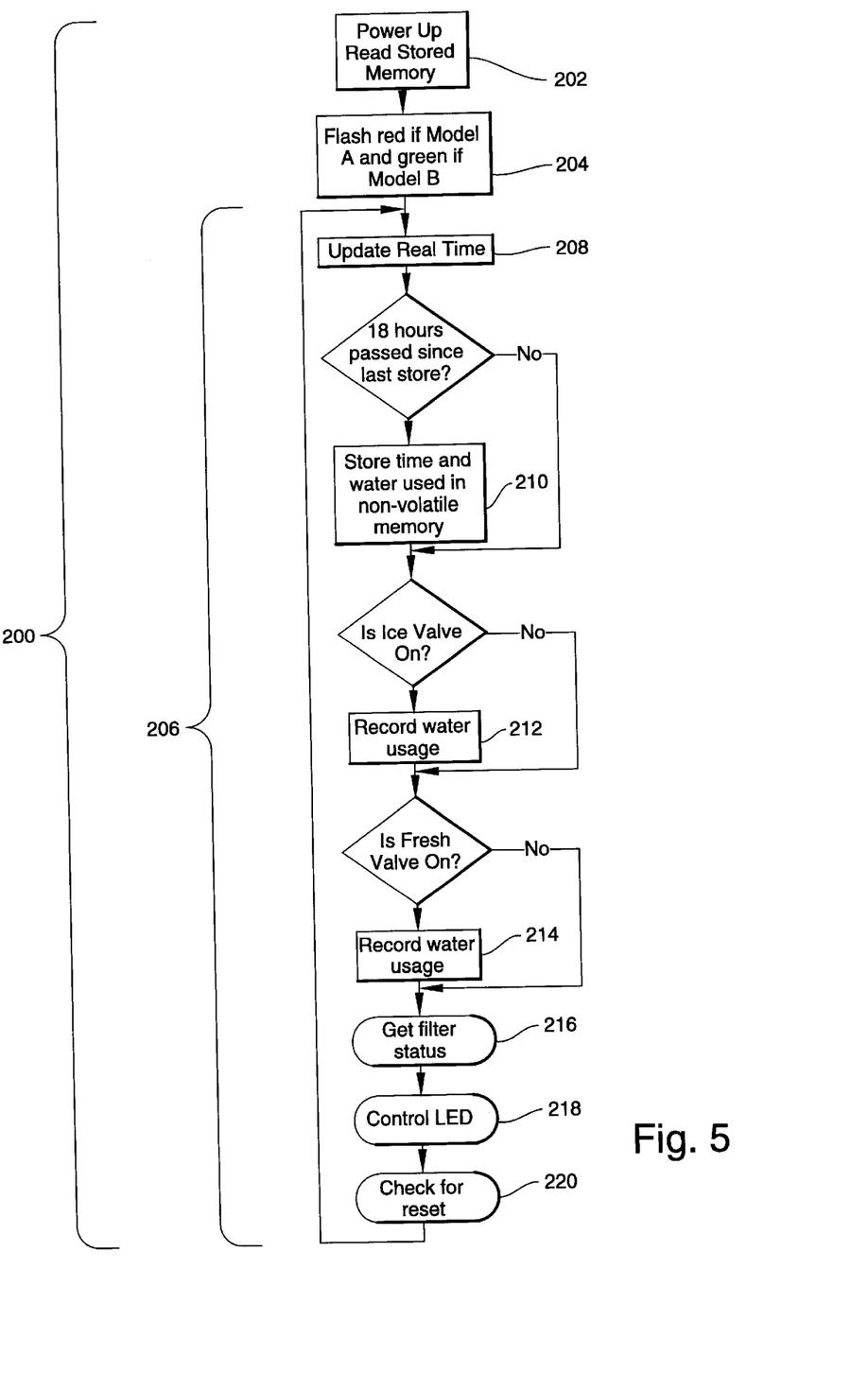
FIG. 5 is a flow chart illustrating the programming and logic of the filter control and indicator system of FIGS. 1 and 4 and more particularly illustrates the power-up and main subroutines of the filter control and indicator system.

Referring to FIG. 5, when the power is first supplied to the microprocessor device 140, a Power-up Subroutine 200 is initiated. At step 202, the microprocessor device reads the stored memory. At Step 204, the microprocessor device 140 sends a signal to the indicator 66 to flash red if the refrigerator is a Model A and green if it is a model B.

The microprocessor device 140 then enters a continuously repeated main subroutine 206. Within each repetition of main subroutine 206, microprocessor device 140 updates its clock at step 208 and, once every 18 hours, stores the time and water used in the non-volatile memory at step 210. At steps 214 and 216, respectively, the amount of water used is incremented if the ice valve 52 is open or if the fresh water valve 54 is open. The open time for each valve 52 and 54 is weighted for the normal water flow rate associated with the valve. At steps 216, 218 and 220, respectively, the microprocessor calls the filter status subroutine 250, the control subroutine 300 and the reset subroutine 350, after which the main subroutine 206 repeats.

Figures 6, 6A:
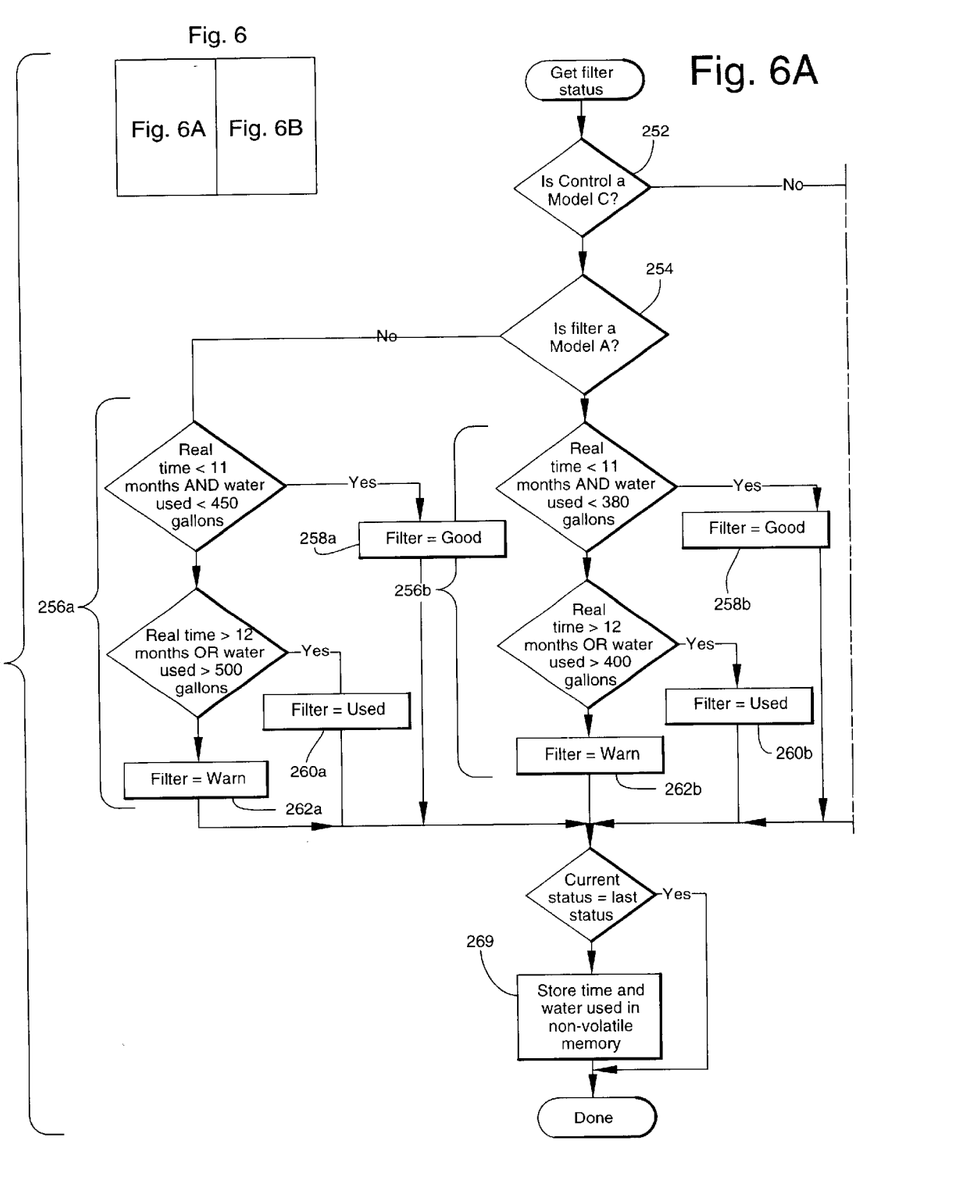
FIGS. 6, 6A, 6B are flow charts illustrating the filter status subroutine of the main subroutine of FIG. 5.
Figure 6B:
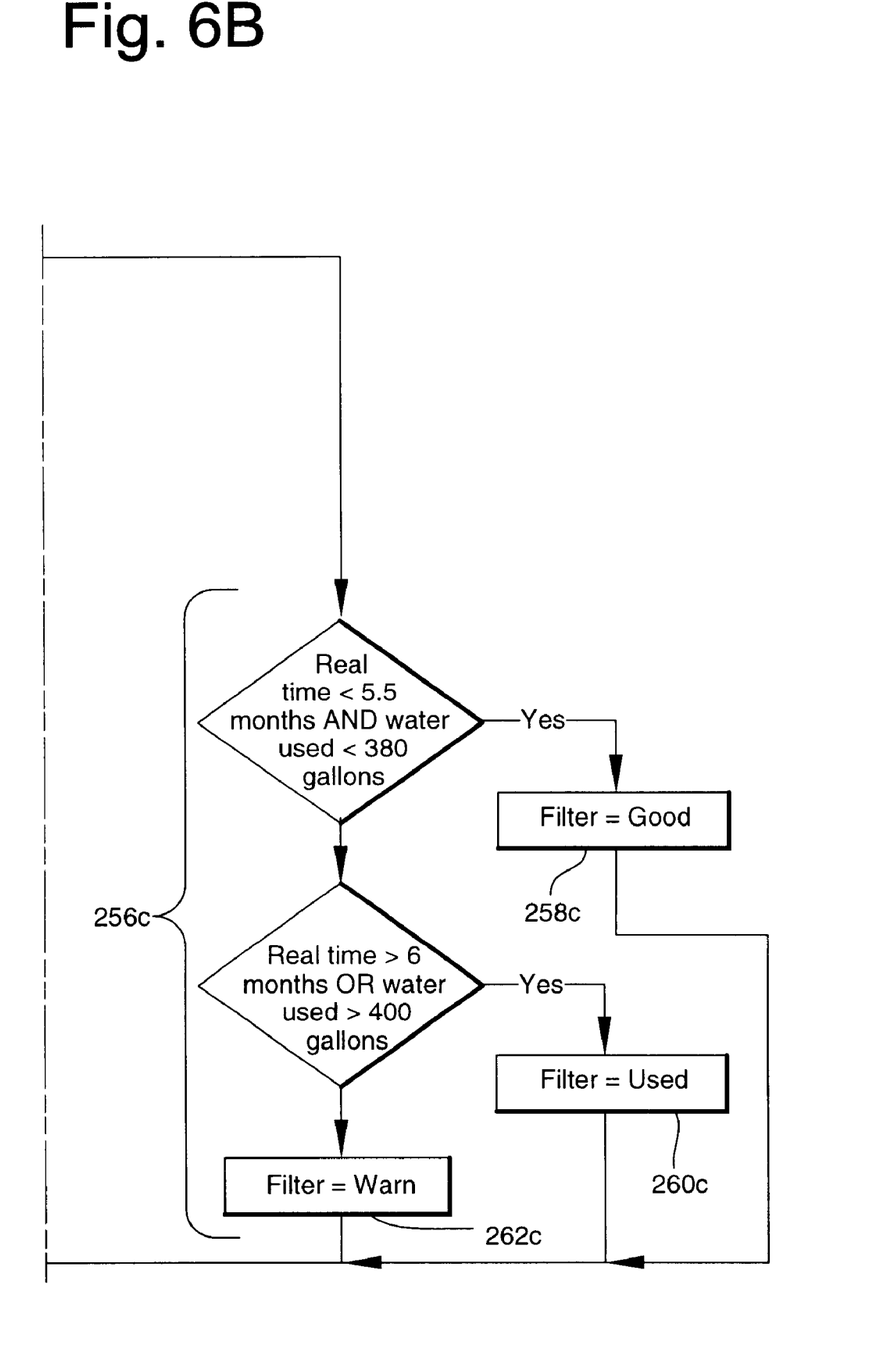

Referring to FIG. 6, the filter status subroutine 250 determines at steps 252 and 254 whether refrigerator 10 is a model A, B or C and directs the program to one of water usage comparison subroutines 256a, 256b and 256c, respectively for the appropriate model. In each respective water usage comparison subroutine 256a, 256b, and 256c, at respective steps 258a, 258b and 258c, the status of the filter is designated as "good" if less than a first predetermined time period has passed and less than a first predetermined quantity of water has been consumed, as indicated by the information stored in memory since the last reset. In each respective water usage comparison subroutine 256a, 256b, and 256c, at respective steps 260a, 260b and 260c, the status of the filter is designated as "used" if more than a second predetermined time period of usage or more than a second predetermined quantity of water has been consumed since the last reset. In each respective water usage comparison subroutine 256a, 256b, and 256c, at respective steps 262a, 262b and 262c, the status of the filter is designated as "warn" if the status has been set as neither "good" or "used".

Finally, at step 270, the time and water used is stored in non-volatile memory if the status of the filter has not been changed by the water usage comparison subroutine 256a, 256b or 256c. The status is not restored if it hasn't changed so as to maximize the useful life of the EEPROM non-volatile memory.

Figure 7:
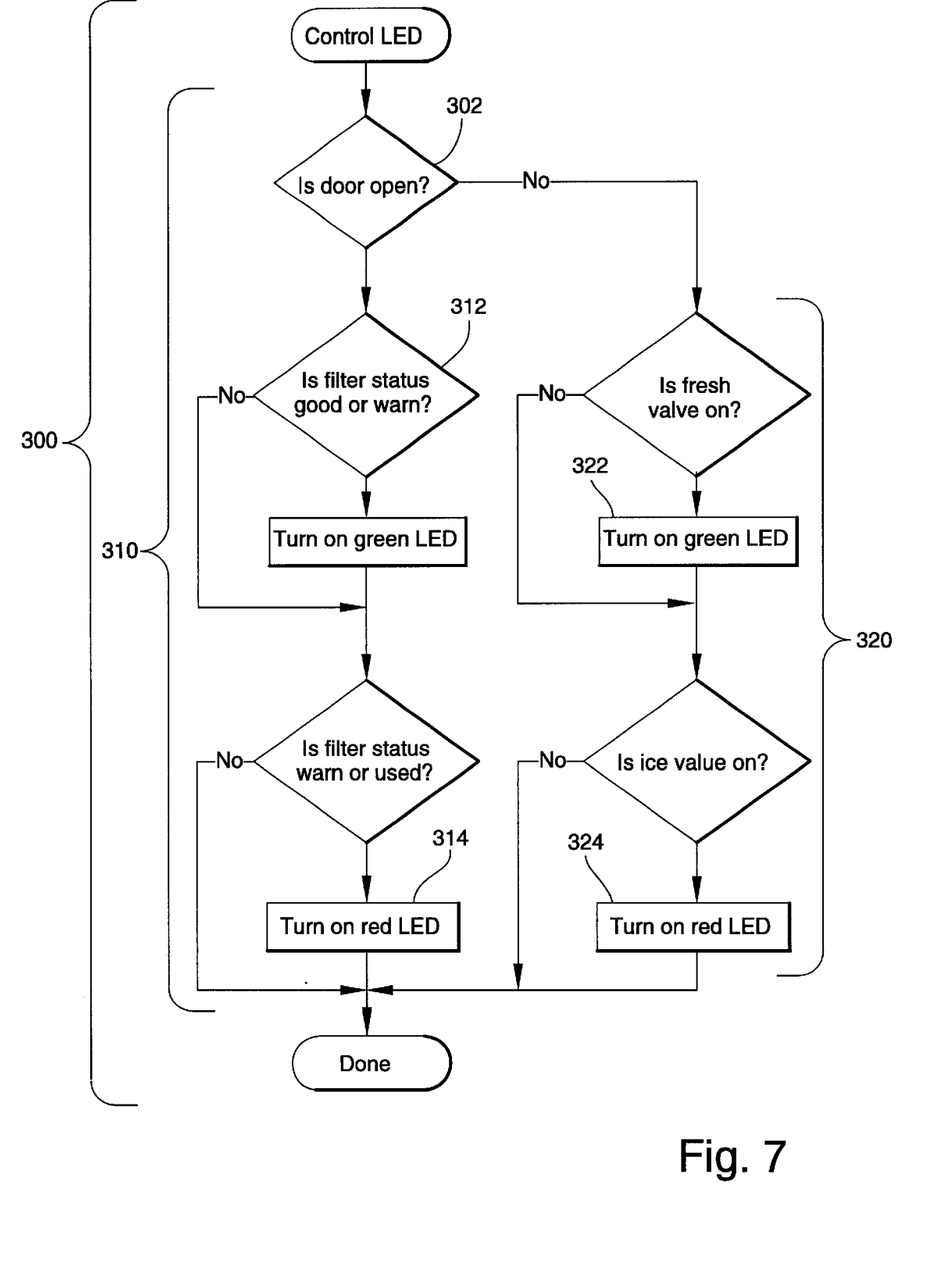
FIG. 7 is a flow chart illustrating the indicator subroutine of the main subroutine of FIG. 5, including the indicator subroutine and the diagnostics subroutine.

Referring to FIG. 7, the control subroutine 300 determines at step 302 if the fresh food door 20 is open by monitoring the voltage across the fresh food light 24.

If the fresh food door 20 is detected as open, then indicator subroutine 310 is run. At step 312, the green LED die 134 is illuminated if the status of the filter has been saved as "warn" or as "good". At step 314, the red LED die 132 is illuminated if the status of the filter has been saved as "warn" or as "used". Thus, if the status has been saved as "warn", both LED die are alternatingly illuminated and the status indicator 66 appears amber in color.

The alternating signal of red and green is created by step 312 always turning off the green die, off if it is on, and, after a built-in time delay by having step 314 always turn off the red die, if it is on. After a subsequent time delay, the programming again returns to step 312, turning off the red LED and turning on the green LED.

If the fresh food door 20 is detected as closed, then diagnostic subroutine 320 is run. At step 312, the green LED die is illuminated if the water dispenser valve 54 is open. At step 324, the red LED die is illuminated if the water valve 52 to the ice making apparatus 48 is open. If both valves 52 and 54 are open, both LED die are illuminated and the status indicator 66 appears amber. The diagnostic subroutine 320 permits detection of malfunctions of the water valves 52 and 54 or the water filter status monitoring and indicating system 70 by a service technician manually by depressing the light switch 26 and selectively operating the valves 52 or 54, the service technician can isolate faults in the system.

Figure 8:
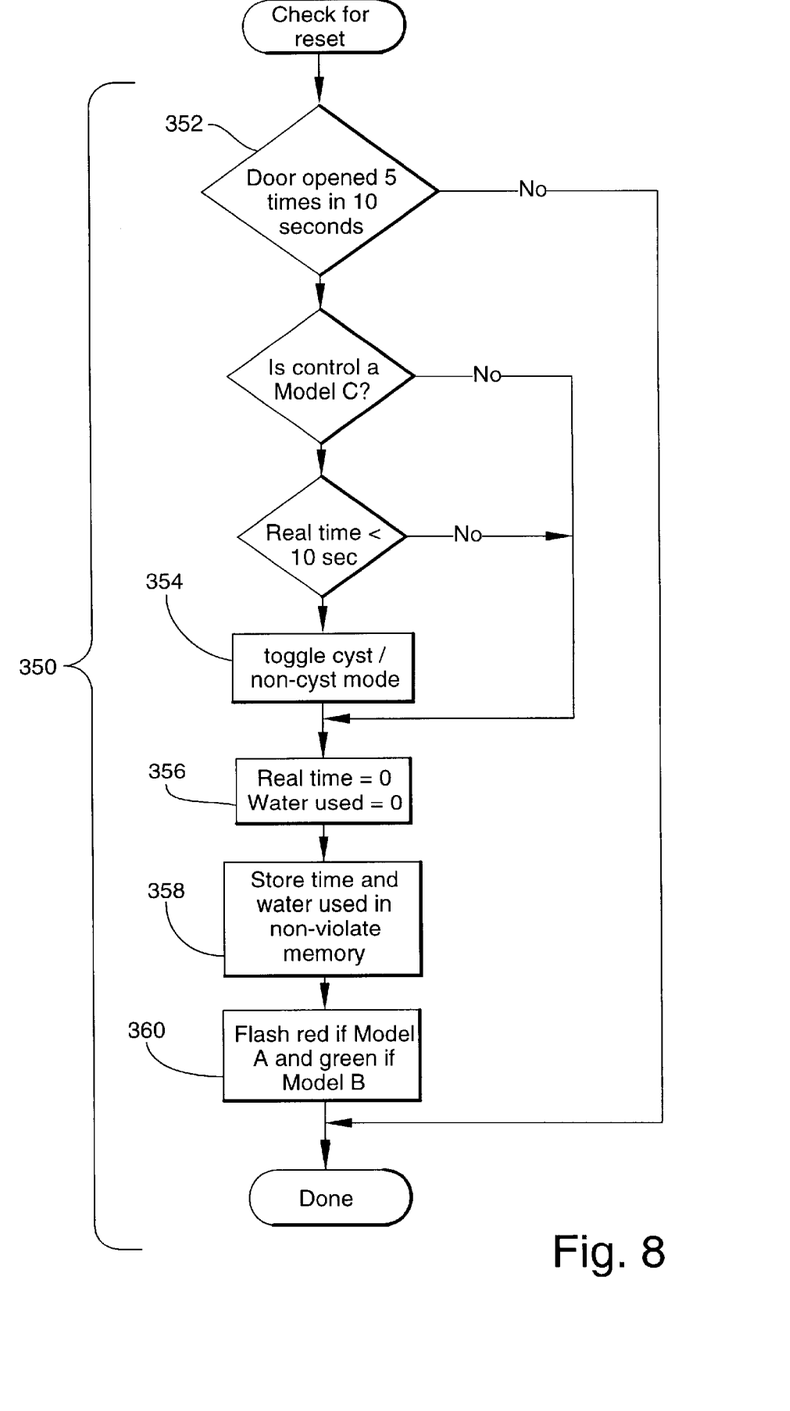
FIG. 8 is a flow chart illustrating the reset subroutine of the main subroutine of FIG. 5.

Referring to FIG. 8, the reset subroutine 350 determines at step 352 if the light switch 26 has been depressed 5 times in less than ten seconds, indicating the user is sending a reset instruction to the microprocessor device 140. The user should do this when the filter is replaced. If a reset instruction has been detected at step 352, then the time and water usage counters are reset to zero at step 356 and stored to non-volatile memory at step 358. However, if the system has already been reset, within the last 10 seconds, that is, a reset instruction has been sent twice, then, at step 354, the microprocessor device reads the input as an instruction that a different type of filter is being used and changes the model setting from a model A to a model B. Finally, at step 360, the indicator is illuminated red or green to indicate the model setting.

Operation of the Water Filter Status Monitoring and Indicating System Components The purpose of the water filter indicator is to provide the consumer with a reliable measure of the filter cartridge end of life condition. There are two criteria for end of life, namely a prescribed number of gallons and a fixed period of real time. In order to monitor the water flow, the electrical inputs to both the ice maker valve and the dispenser valve are monitored by the WFI. Since the processor "knows" that the valves have flow rates of 0.3 and 0.5 gallons per minute, the flow can be computed from the amount of time which each is energized. It is in this fashion that the usage in gallons is accumulated.

Real time is simply accumulated by a divider from the processors clock. Since the clock used in this case is the internal RC oscillator, it is subject to more inaccuracy than would be experienced with a crystal controlled or 60 Hz based time keeping scheme. The Microchip literature guarantees this tolerance to be about 7.0% over voltage and temperature 4variations. Also included in the microprocessor is an EEPROM device, which provides non-volatile retention of flow as well as real time.

The state of the water filter is indicated on a bi-color LED incorporating a red and a green die in the same package. By activating both die at a 50% duty cycle an amber color is obtained. Up to 90% life the indicator is green, from 90% to just less than 100% it is amber, and at end of life it shows red. User reset of the accumulated flow and time variables is effected by activating the door switch five times within 5 seconds.

In order to facilitate factory test as well as servicing in the field, the LED displays usage status only when the door is open. When the door is closed, the LED is off unless one or both of the valve inputs is active. The LED indicates red for the ice maker valve, green for the dispenser valve and amber if both valves are active.

The above constitutes a detailed description of the best mode of the present invention as contemplated by the inventors at the time of filing. It is further contemplated that changes and modifications may be made from the best mode described herein within without departing from the spirit of the present invention or the intended scope of the claims below.

What is claimed as novel is as follows:

1. A method for determining the need to replace a water filter of a refrigerator having at least one water-using accessory that is supplied water from the water filter in response to a demand for filtered water by the at least one water-using accessory, the method comprising:

determining the elapsed time of the supply of filtered water from the water filter to the at least one water-using accessory;

determining the volume of filtered water supplied for the elapsed time by the step of calculating the product of the elapsed time and a predetermined water flow rate of the at least one water-using accessory;

maintaining a total filtered-water volume by summing the calculated filtered-water volume; and indicating to the user when the total filtered-water volume reaches an amount that represents a need to replace the filter.

2. The method according to claim 1 wherein the determination of the elapsed time comprises sensing the initiation and cessation of the flow of filtered water from the filter to the at least one water-using accessory for each demand and determining the elapsed time between the initiation and cessation.

3. The method according to claim 2 wherein the determination of the elapsed time between the initiation and cessation comprises monitoring a clock between the initiation and cessation and storing a time value representative of the elapsed time in the memory of a microprocessor.

4. The method according to claim 3 wherein the step of calculating of product comprises storing the flow rate for the at least one water-using accessory in the memory of the microprocessor and using the microprocessor to multiply the stored time value by the stored flow rate to obtain a filtered-water volume value.

5. The method according to claim 4 wherein maintaining of a total filtered-water volume comprises adding the filtered-water volume value to a filtered water total volume value stored in the memory of the microprocessor.

6. The method according to claim 5 wherein the time value is determined for each demand.

7. The method according to claim 6 wherein the filtered-water volume value is determined for each demand.

8. The method according to claim 7 wherein the filtered water total volume value is determined by summing the filtered-water volume value at the end of each demand with the current filtered water total volume value.

9. The method according to claim 8 and further comprising, when the refrigerator has multiple water-using accessories with different flow rates, selecting the flow rate for the one of the multiple water-using accessories currently demanding water from multiple flow rates stored in the microprocessor memory.

10. A method for determining the need to replace a water filter in a water supply system of a refrigerator having at least one water-using accessory, the water supply system includes an electrically actuated valve that controls the flow of water from the filter to the at least one water-using accessory and a controller operably coupled to the at least one water-using accessory and electrically coupled to the valve to open and close the valve in response to the demand from the at least one water-using appliance, the method comprising:

determining the elapsed time that the valve is open;

determining the volume of filtered water supplied for the elapsed time by the step of calculating the product of the elapsed time and a predetermined water flow rate of the at least one water-using accessory;

maintaining a total filtered-water volume by summing the calculated filtered-water volume; and indicating to the user when the total filtered-water volume reaches an amount that represents a need to replace the filter.

11. The method according to claim 10 wherein the determination of the elapsed time comprises the controller determining the time that the valve is open.

12. The method according to claim 11 wherein the determination of the elapsed time between the initiation and cessation comprises monitoring a clock in the controller between the opening and closing of the valve by the controller and storing a time value representative of the elapsed time in the memory of a microprocessor of the controller.

13. The method according to claim 12 wherein the step of calculating of product comprises storing the flow rate for the at least one water-using accessory in the memory of the microprocessor and using the microprocessor to multiply the stored time value by the stored flow rate to obtain a filtered-water volume value.

14. The method according to claim 13 wherein maintaining of a total filtered-water volume comprises adding the filtered-water volume value to a filtered water total volume value stored in the memory of the microprocessor.

15. The method according to claim 14 wherein the time value is determined for each demand.

16. The method according to claim 15 wherein the filtered-water volume value is determined for each demand.

17. The method according to claim 16 wherein the filtered water total volume value is determined by summing the filtered-water volume value at the end of each demand with the current filtered water total volume value.

18. The method according to claim 17 and farther comprising, when the refrigerator has multiple water-using accessories with different flow rates, selecting the flow rate for the one of the multiple water-using accessories currently demanding water from multiple flow rates stored in the microprocessor memory.

* * * * *